March 30, 1948.                    C. C. LEACH                    2,438,758
                              LIQUID COLUMN LEVEL
                              Filed Dec. 29, 1943
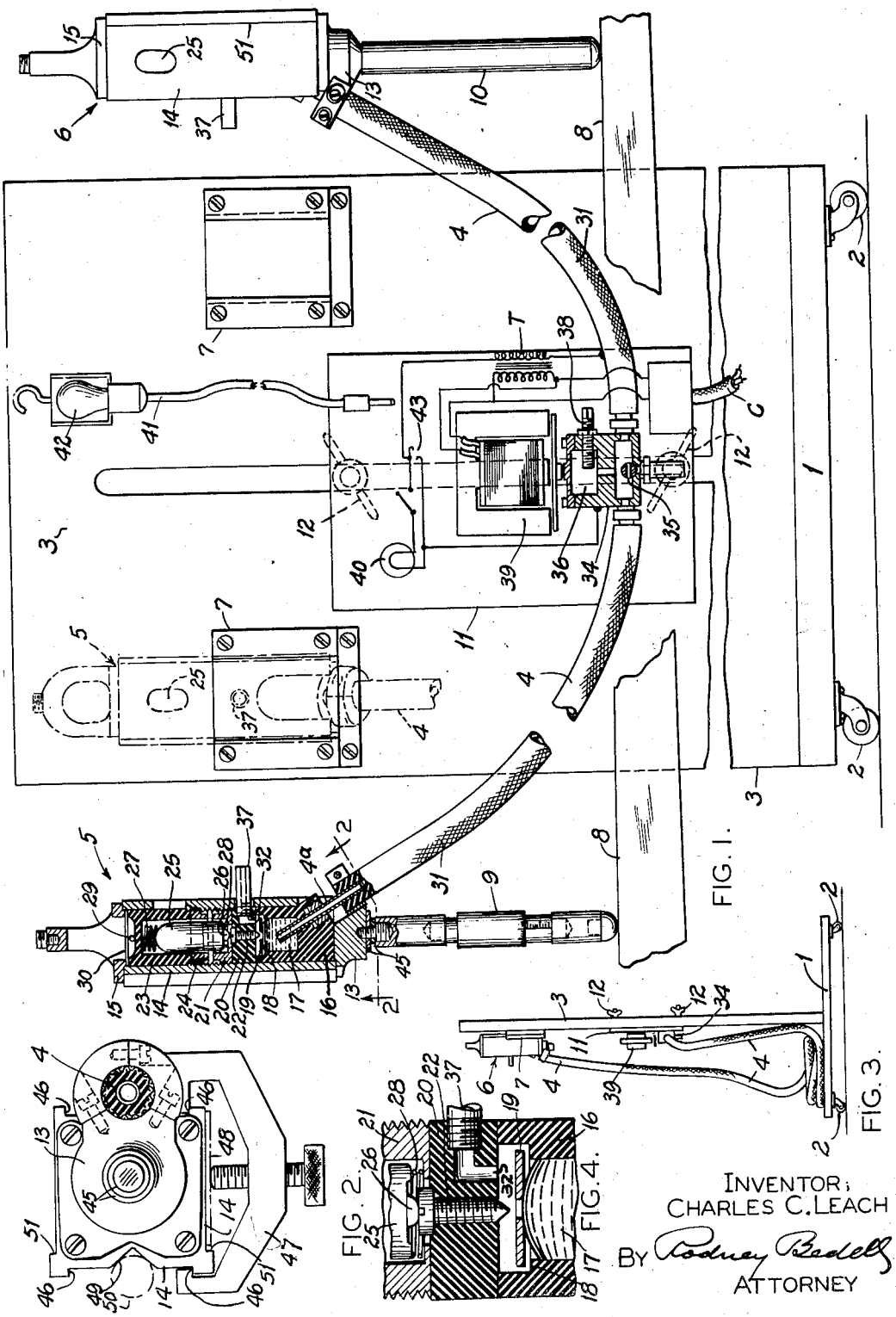
INVENTOR;
CHARLES C. LEACH
BY Rodney Bedell
ATTORNEY Patented Mar. 30, 1948

2,438,758

UNITED STATES PATENT OFFICE 2,438,758

LIQUID COLUMN LEVEL

Charles C. Leach, Clayton, Mo., assignor of one-half to Marcel Boulicault, St. Louis, and Roland J. Miller, Webster Groves, Mo.

Application December 29, 1943, Serial No. 516,016

6 Claims. (Cl. 33—209)

The invention relates to levels of the type in which an elongated flexible tube has separately movable instruments at its ends, there being a liquid in the tube, and usually in the instruments also. The device employs the tendency of the surface of the liquid at the ends of the tube, or in the instruments, to seek a common level. If one instrument is raised or lowered relative to the other instrument, the rise or fall of the liquid level in the latter instrument, relative to a given point, will indicate to the observer the relative position of the other instrument and of the surfaces to which the instruments are applied.

One object of the invention is to facilitate the use of such a level for measuring minute variations in the relative height of spaced objects or of different points on the same object.

Another object is to avoid the necessity of close observation or scrutiny of a portion of the level to determine its reading. It is desired to provide the level with a readily observed signal, audible or visible, which will function under a predetermined condition.

Another object is to facilitate the use of such a level by a person who is at a position relatively remote from the ends of the liquid-containing tube and the instruments associated therewith.

Other objects are to avoid loss of the fluid and to maintain the fluid in a compact condition and to provide for close adjustment of the extent of the fluid throughout the level.

These and other detail objects of the invention as will appear from the following description are attained by the structure illustrated in the accompanying drawings, in which—

Figure 1 is in part an elevation and in part a section through the level.

Figure 2 is a transverse section taken on the line 2—2 of Figure 1 and drawn to an enlarged scale.

Figure 3 is an edge or end view of the level.

Figure 4 is a vertical section through one of the instruments shown in Figure 1 and drawn to an enlarged scale.

The level illustrated is particularly adapted for use in determining the relative height of widely spaced points such, for example, as the opposite ends of a lathe or planer bed or of spaced points on an airplane wing or frame or of a jig or tool for use in connection with the same.

In one convenient arrangement, the structure comprises a platform 1 mounted on castors or rollers 2 and having an upstanding frame 3 and carrying the flexible tube 4 attached at its ends to instruments 5 and 6 which may be mounted upon brackets 7 on frame 3 or may be handled by the user independently of the brackets and independently of each other. When instruments 5 and 6 are mounted on brackets 7, the assembly forms a self-contained unit which may be moved readily over a floor to a desired location and the instruments 5 and 6 may be lifted from brackets 7 and applied to surfaces the height of which relative to each other, is to be determined. For example, it may be desired to determine the flatness or relative heights of spaced points on a large surface plate such as is used in machine shops or like places to lay out centers, shoulders and other points on dies and jigs. Such a plate is indicated at 8 and the instruments 5 and 6 are shown applied to plate 8 through a micrometer 9 and a micrometer rod 10 respectively.

A panel 11 is slidably mounted on frame 3 and adjustably retained in place by studs with wing nuts 12. The intermediate portion of tube 4 is carried on panel 11 and may be raised or lowered therewith on frame 3 to accommodate different conditions of use of the level.

Preferably the body of each instrument 5 and 6 is of rigid metal and includes a base 13, one or more upstanding walls 14 and a cap 15. One end of tube 4 is secured to base 13. A cup-like member 16, of plastic or other electrically insulated material, is seated on base 13, and a sleeve 4a inserted at one end into tube 4 projects at its other end into the interior of cup 16.

Tube 4 and cup 16 are supplied with liquid mercury, as indicated at 17. The inside of cup 16 is shouldered at 18 to form a stop limiting the downward movement of a disc 19, apertured at its center, which normally floats on the surface of the mercury. A closure 20 is applied to cup 16 and an annular nut 21, threaded inside wall 14, thrusts the closure against the cup and the cup against base 13. A contact screw 22, threaded through closure 20, has a point projecting below the closure in line with the aperture in disc 19 and a head projecting above the closure. A downwardly opening housing 23 is thrust against cap 15 by an annular nut 24. A lamp 25 is supported through its central electrode 26 resting on screw 22 and projects upwardly into housing 23 and is held against play within the housing by a spring 27 compressed between the upper end of the lamp and the opposing end of the housing. A relatively light spring 28 surrounds contact screw 22 and bears against the annular electrode on the lamp, surrounding electrode 26, and a cooperating shoulder formed on nut 21.

Cup 16, closure 20 and housing 23 are non-conductive of electricity and housing 23 is translucent. The upper face of the housing is concave and mounts a ball 29 and a cover glass 30 provided with crossed center lines or a center dot and forming a device indicating the perpendicularity of the instrument. This device will be illuminated when lamp 25 is lit and this association of the lamp and the device 29, 30 enables the operator to readily observe simultaneously the perpendicularity of the instrument at the same time that he observes the height of the instrument, relative to the other instrument, without shifting his glance.

Screw 22 and the liquid mercury comprise means for making and breaking an electric circuit, of which they form parts, which includes the lamp electrodes, spring 28, nut 21, wall 14, base 13 and the metal braid 31 about tube 4.

A vent 32 in closure 20 leads from the interior of cup 16 to the atmosphere to avoid air pressure interference with the rise and fall of the mercury in the cup to the extent necessary to make and break the circuit. If the mercury rises substantially above the lower end of screw 22, disc 19 will seat against the bottom of closure 20, sealing vent 32. This arrangement will prevent the escape of mercury through the vent if the instrument is lowered substantially below the height of the instrument at the other end of the tube or if the instrument is inverted. The upper face of the mercury column will be convex due to the surface tension of the mercury and there will be no leakage of the mercury around the edge of the disc prior to the closure of the vent. Also the convex face of the mercury column tends to center disc 19 axially of the cup and maintain the alignment of the hole in the disc and the point of the contact 22.

The intermediate portion of tube 4 is provided with a member 34 mounted on panel 11 and including a valve 35 and a reservoir 36. When the level is constructed, mercury is supplied to reservoir 36, tube 4 and the instruments through valve 35 and, to facilitate this operation, an exhaust pump hose 37 may be connected to vents 32. A plunger 38 is adjustably mounted on member 34, projecting into reservoir 36, and providing means for minutely controlling the volume of mercury in the tube and in cups 16.

A vibrator 39 on panel 11 is arranged to contact the wall of reservoir 36, and the vibrations of this device transmitted to the mercury column promotes prompt flow of the mercury when either instrument 5 or 6 is elevated and therefore makes the level more responsive to slight variations in the relative positions of the instruments.

Preferably a lamp 40 is placed in a circuit common to both lamps 25 and will light when either of lamps 25 is lit. Also an extension cord 41 to a lamp 42 may be plugged into a jack 43 on panel 11 and may be handled by the operator to hold alongside of one of the instruments 5 or 6 for use in determining the action of the light on the other instrument when the latter may be out of range of vision.

The electric circuits of the device are diagrammatically illustrated in Figure 1 and are energized by a cord C which may be attached to the usual 110-volt outlet. Preferably the lamps are in a circuit energized from the 110-volt circuit by a transformer T. The use of the transformer eliminates the possibility of shock to the user from portions of the level which are part of the circuit.

For accurate work, a micrometer 9 and micrometer rod 10 are applied to the instruments 5 and 6 respectively, one or more adjusting washers 45 being used if desired, and the instruments are placed close together on a known level surface. The micrometer is turned down, lowering instrument 5 so that the mercury rises therein, until the light is on in instrument 5, indicating that it is at a lower height than instrument 6. The micrometer is then turned up until the light goes off and the micrometer reading is noted. The micrometer is turned up further until the light goes on in the other instrument and the micrometer reading is noted. The differential in the readings may be increased or decreased by adjusting the volume control plunger 38 so that both signals will be out during a known few thousandths of an inch. The level may then be used to determine the relative height of surfaces to which the instruments are applied, although the surfaces are far apart. For example, the level has been constructed and used satisfactorily for this purpose in application to points spaced approximately thirty feet from each other.

If such fine degree of accuracy is not needed, flat or round rod scales may be applied to the instruments, as indicated in Figure 2, where the wall 14 of the instrument is shouldered at 46 to receive a clamp 47 by which a scale 48 may be secured to the instrument or a V groove 49 may be formed in wall 14 to accommodate a measuring rod 50 which may be secured to the instrument by a clamp (not shown) similar to clamp 47 and seated against shoulders 51.

Instead of the lamps lighting when the instruments are at different levels, the height of the mercury in both cups 16 may be raised by adjusting plunger 38 until both lights are lit when the instruments are at the same level and one of the lights will go out when the associated instrument is raised above the level of the other instrument.

While the use of the plural instruments at opposite ends of the tube is preferred, one end of the tube could be permanently secured at a fixed height and a circuit making and breaking instrument applied to the other end of the tube only, whereupon the height of an object to which the instrument is applied could be determined relatively to the single known height of the fixed end of the tube.

It is within the scope of the invention to substitute an audible signal for each lamp 25, 40 or 42, it being understood that in the broader form the invention is applicable to any arrangement whereby an electric circuit is closed, or if preferred is opened, when the spaced instruments are at different levels, and awareness of the signal devices is made possible irrespective of the distance or barriers between them.

A spirit level may be substituted for the ball and socket level indicated at 29, 30 without affecting the operation of the instrument.

The embodiment of the invention may be varied substantially from the above specific description and corresponding illustration in other ways than here indicated and the exclusive use of those modifications coming within the scope of the claims is contemplated.

What is claimed is:

1. In a level comprising independently movable instruments connected by an elongated flexible tube containing liquid and a signal device actuated by the height of the liquid in one of the instruments, means arranged to jar the liquid to promote the ready flow of the liquid in said instrument.

2. In a level, independently movable instruments, an elongated flexible tube connecting said instruments and containing metal in liquid form, a signal device in one of the instruments actuated by an electric circuit of which said metal forms a part and closed by an increase in the height of the metal in said instrument, and a vibrator arranged to jar the metal and thereby maintain it in a compact condition.

3. A level comprising independently movable instruments, a flexible tube connecting them, a liquid in the tube, an electric circuit comprising the liquid and an element along the tube and means for closing the same when the liquid level in one of the instruments rises above a predetermined point, and a lamp lit by the closing of said circuit.

4. In a level, an elongated flexible tube containing a liquid, and an instrument at one end of the tube provided with a liquid-receiving chamber open to the tube and having an air vent above the normal level of the liquid in the chamber, there being an electric circuit formed by the liquid and by the exterior of the tube and closed by the movement of the liquid to a predetermined point, a signal device actuated by the closing of the circuit, a float in the chamber and supported on the liquid therein and operative upon the movement of the liquid, prior to the latter's reaching said point, to close said vent.

5. In a level, an instrument including a chamber substantially but not completely filled with liquid, an elongated flexible tube having a terminal portion extending well into said chamber and opening thereto at a point spaced substantially from the chamber walls and immersed in the liquid irrespective of the position of the instrument, a float resting on the liquid in said chamber, an air vent from said chamber at a point above the normal level of liquid therein and adapted to be closed by said float as the liquid rises, there being an electric circuit closed by the rise of the liquid prior to the closing of said vent, and a signal device actuated by the closing of the circuit.

6. In a level of the class described, spaced instruments movable independently of each other, and a flexible tube connecting them and containing liquid, signal devices in said instruments actuated by the relative rise and fall of the liquid in the instruments, at least one of the instruments having upwardly and downwardly facing fixed seats arranged for selectively mounting a micrometer.

CHARLES C. LEACH.

REFERENCES CITED

The following references are of record in the file of this patent:

UNITED STATES PATENTS

| Number | Name | Date |
|---|---|---|
| 318,885 | Espenshied | May 26, 1885 |
| 397,294 | Karr | Feb. 5, 1889 |
| 872,183 | Jenning | Nov. 26, 1907 |
| 986,109 | Weymouth | Mar. 7, 1911 |
| 1,375,278 | Clayton | Apr. 19, 1921 |
| 1,907,402 | Fidor | May 2, 1933 |

FOREIGN PATENTS

| Number | Country | Date |
|---|---|---|
| 3,252 | Great Britain | 1881 |
| 364,591 | Germany | 1923 |
| 635,090 | Germany | 1936 |